Patented July 17, 1951

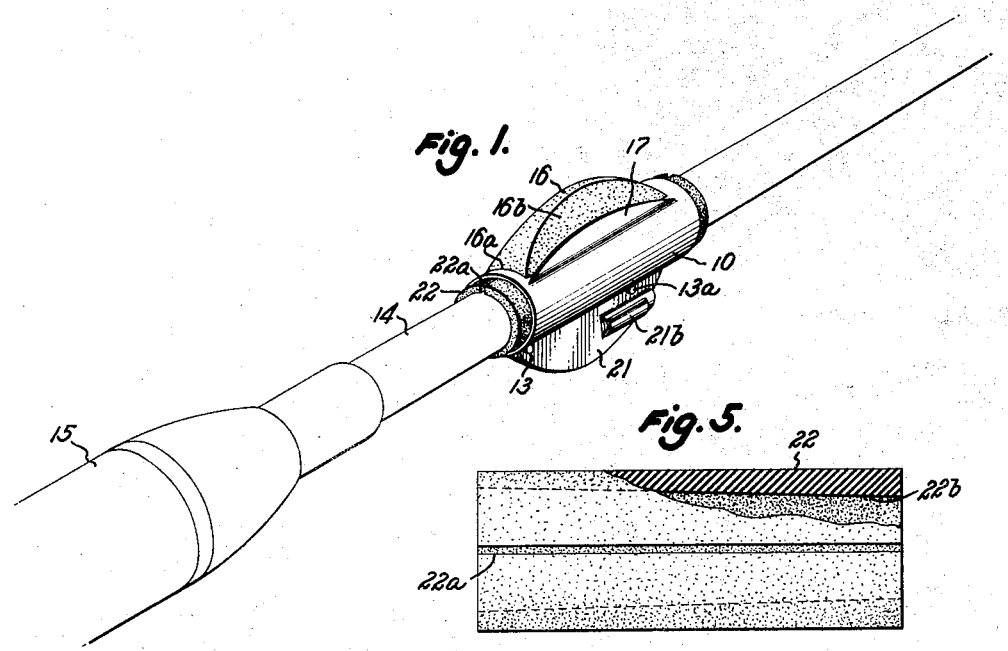
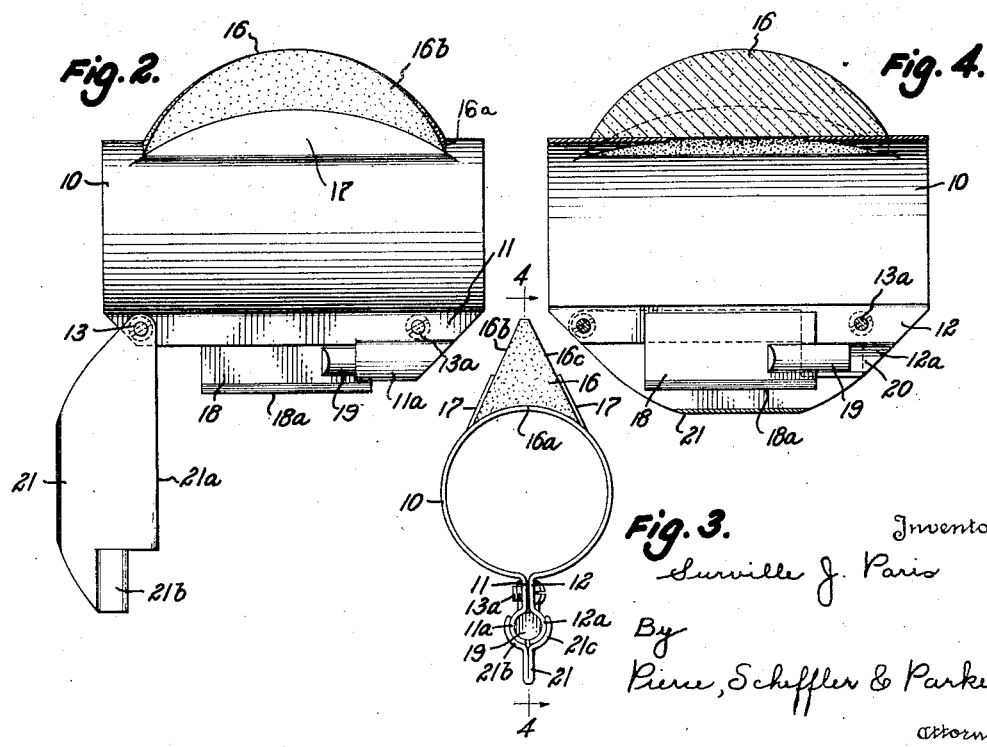

2,561,289

UNITED STATES PATENT OFFICE 2,561,289

ATTACHMENT FOR FLY AND CASTING RODS

Surville J. Paris, Wausau, Wis.

Application November 20, 1947, Serial No. 787,068

3 Claims. (Cl. 30—296)

This invention relates to attachments for fly and casting rods and in particular to a combined holder for a whetstone and knife that can be easily installed on the rod. The whetstone is for sharpening fish hooks and the knife for cutting lines and gut leaders. The combined tool when mounted just forward of the rod handle occupies a position most convenient to the sportsman for use of the stone or knife and avoids the need for carrying these two tools separately in the pockets. Also with the tools firmly attached to the rod there need be little fear of misplacing them or accidentally dropping them into the stream. The tool holder also provides for easy removal of the knife for sharpening or replacement.

A preferred embodiment of the invention is illustrated in the accompanying drawings wherein Fig. 1 is a view in perspective of a fishing rod with the combined tool in place just forward of the handle; Fig. 2 is a side elevation of the tool with the knife guard open; Fig. 3 is an end elevation looking into Fig. 2 from the right end with the knife guard closed; Fig. 4 is a longitudinal section taken on line 4—4 of Fig. 3; and Fig. 5 is a side elevation of a bushing which serves to adapt the tool for use on rods considerably smaller in diameter.

Referring now to the drawings, the combined tool is seen to include a split sleeve 10 preferably made from spring steel and rust resistant. The underside of the sleeve 10 terminates in a pair of juxtaposed flanges 11, 12 extending for the entire length of the sleeve and which are apertured near each end to receive screws 13, 13a by which the sleeve is clamped around the fishing rod 14 just forward of the handle portion 15.

For holding the whetstone 16 in place, a pair of elongated and arcuate tongues 17 are struck up from the upperside of the sleeve 10 and these are sloped towards each other to provide an "undercut" recess open at both ends for receiving the whetstone. So that the latter will be seated firmly in place, the bottom face 16a of the stone is made concave so as to lie flat against that portion of the exterior surface of sleeve 10 remaining between the tongues 17 after the latter have been struck up. The side faces 16b, 16c of the stone are tapered to correspond with the slope of the tongues 17 and therefore lie flat against the latter.

The knife which serves as a cutter for gut leaders is comprised of a thin blade 18 set into a narrow vertical diametrical slot which extends approximately half way through a short cylindrical pin 19. The slot can be made narrow enough to hold the blade tightly by friction or the blade can be soldered fast to the pin subsequent to its insertion in the slot. Pin 19 in turn is held by a friction fit in a cylindrical socket 20 formed by semi-cylindrically channeled extensions 11a, 12a of the flanges 11 and 12. As clearly seen from Fig. 4, the upper half of blade 18 extends between flanges 11, 12 to prevent the blade from yielding in a lateral direction, and the lower, cutting edge 18a when not in use is protected by a cover 21 also of rust resistant metal that is hinged at one side to the sleeve 10 at clamping screw 13. At the other side, the walls of the cover are offset from the inner edge 21a and bent outwardly to form arcuate clamping jaws 21b, 21c that fit snugly around the arcuate extensions 11a, 12a forming socket 20. Preferably, the jaws 21b, 21c of cover 21 as seen in Fig. 3 extend for slightly more than half way around the socket 20 and so form a spring catch that serves to grip the latter tightly when the cover is closed.

Most bait casting rods are made of steel while some trout fly rods are made of bamboo and others made from steel. The steel rod just above the handle is usually much thinner than is the bamboo rod. To permit use of a sleeve 10 of the same size on the different sized rods, a rubber bushing 22 slit lengthwise at 22a may be supplied. Preferably, the interior surface 22b of the bushing is tapered slightly from one end to the other to match the usual rod taper while its exterior surface is of uniform diameter to fit snugly within the cylindrical sleeve 10. Bushing 22 would then be spread at slit 22a and slipped into place on the rod when the combined gut leader cutter and hook sharpener is installed on the smaller diameter steel rod, as shown in Fig. 1, and omitted for the larger bamboo rod. Should a single size of bushing prove inadequate for covering the entire range of rod sizes, the bushings could be made in two or more different sizes each with the same outside diameter but with differently sized internal diameters.

The tool can be installed simply and quickly with the aid of a screw driver. Assuming the screws 13, 13a to have already been removed which releases the flanges 11 and 12 as well as knife 18 and cover 21, the split sleeve 10 is sprung just wide enough to slip over the rod (or over the bushing 22 if used). The screws 13, 13a are then replaced, it being of course necessary to position the cover 21 in place before screw 13 is inserted for it will be remembered that the latter serves as the hinge pin for the cover as well as for drawing the sleeve 10 tightly around the rod. The knife pin 19 is inserted in socket 20 before the screw 13a is finally tightened since at this time the two socket halves 11a, 12a will not be fully joined and the pin 19 can hence be slipped in without difficulty. Screw 13a can now be tightened to draw the corresponding end of sleeve 10 around the rod and simultaneously grip the knife pin 19 in socket 20.

Should the knife blade 18 break or become dull, it can be removed without removing the tool from the rod merely by loosening screw 13a and sliding the old blade to the left until pin 19 clears socket 20. The new blade and pin can then be inserted and screw 13a retightened.

In conclusion it should now be evident that the invention possesses considerable merit. The stone and knife are most useful tools for a rod fisherman to have and the unique tool holder according to the invention enables the stone and knife to be mounted upon the rod at a most convenient location. Furthermore, the split-sleeve type holder featuring struck-out tongues for securing the stone in place and the dual purpose screws which serve not only to clamp the holder to the rod but also as a hinge pin for the blade cover, as well as to clamp the blade in place offers a most simple and low-cost construction.

While in accordance with the patent statutes I have hereinabove described and shown a preferred embodiment of the invention, it is to be understood that various minor changes in the construction and arrangement of parts of the combined tool and holder may be made without departing from the spirit and scope of the invention as defined in the appended claims.

I claim:

1. An attachment for a fishing rod comprising a split sleeve having confronting rod clamping flanges extending along one side thereof, removable bolt means extending through said flanges at each end thereof for drawing said flanges towards each other, a knife secured between said flanges, said knife being released upon loosening of said bolt means, and a cover member for said knife pivotally attached to said flanges at one end thereof by the bolt means at such end.

2. An attachment for a fishing rod comprising a split sleeve having confronting rod clamping flanges extending along one side thereof, said flanges including confronting and longitudinally extending channel portions adjacent one end thereof and which together form a split socket, a knife having a blade portion and a support pin insertable in said socket, releasable bolt means extending through said flanges adjacent each end thereof for drawing said flanges towards each other to thereby clamp said sleeve on the rod and said support pin in said socket, and a cover member for said knife pivotally secured to said flanges at the end opposite said socket by the bolt means adjacent such end.

3. A fishing rod attachment as defined in claim 2 wherein a part of the blade portion of said knife lies between said flanges.

SURVILLE J. PARIS.

REFERENCES CITED

The following references are of record in the file of this patent:

UNITED STATES PATENTS

| Number | Name | Date |
|---|---|---|
| 686,712 | Carley | Nov. 19, 1901 |
| 1,277,479 | Ritchie | Sept. 3, 1918 |
| 1,898,422 | Champlin | Feb. 21, 1933 |
| 2,170,514 | Bartosek | Aug. 22, 1939 |
| 2,194,707 | Locker | Mar. 26, 1940 |
| 2,352,921 | Stoltz | July 4, 1944 |